3,595,682
PROCESS FOR PREPARING A SMOKED BONELESS TURKEY ROLL
Jack H. Lind and Henry M. Abrahamson, both of Aneta, N. Dak. 58212
Filed Aug. 28, 1968, Ser. No. 755,847
Int. Cl. A23b 1/04; A22c 21/00
U.S. Cl. 99—229                                               4 Claims

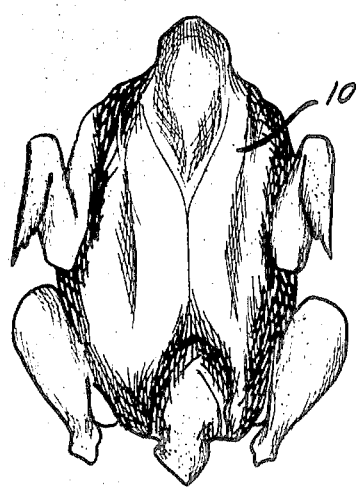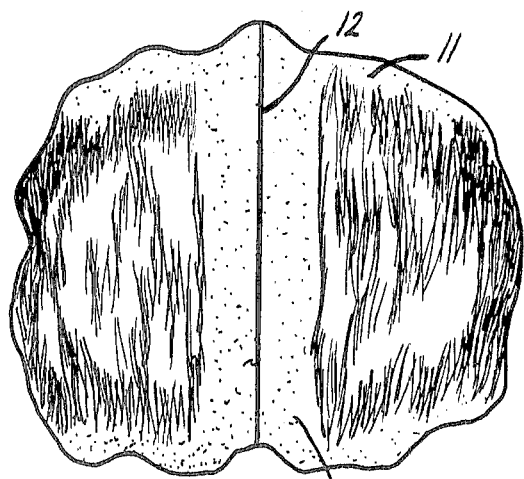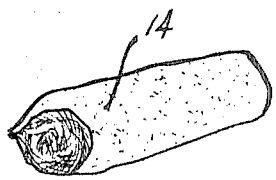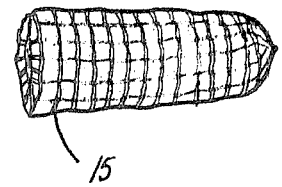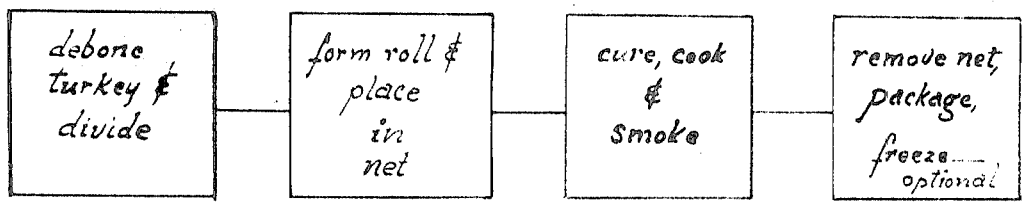

ABSTRACT OF THE DISCLOSURE

A process for preparing a smoked, boneless, fully cooked ready to eat turkey roll which permits forming the roll using the turkey skin for a natural outer casing. The roll is held in a stretchable net during the cooking and smoking, but the net can be removed before sale.

PRIOR ART

Patent No. 3,011,895 discloses a process for making a turkey roll which is cooked and smoked. In this process, the turkey is rolled and cooked under a high pressure in a very rigid cage during the smoking steps so that the meat is always kept under high pressure when it is cooked. This squeezes the meat and distorts it, and greatly increases the cost of processing. Further, the rigid forms which are used for holding the unit when it is being smoked are cumbersome and difficult to use, and add to the cost of processing.

In the prior art, another problem that has been present is the fact that the processed rolls do not want to hold together without some artificial wrapping after they have been processed. Many of them are sold in tight outer wrappers and if they are taken out of the wrappers they will fall apart and can't be sliced easily. In order to overcome this, many different types of binders that are both expensive and which tend to detract from the natural meat flavors and juices have been used. These have only been partially successful.

SUMMARY OF THE INVENTION

The present invention relates to a process whereby the overall concept is to provide for a smoked, boneless turkey roll which is fully cooked and which can be sold without any external fasteners or forms to hold it into a roll form. The process starts out with this concept and the coordinated portions of the process all contribute toward this end. The process is started with the deboning of the turkey by removing the meat and skin in one operation so that the meat will continue to cling to the skin wherever possible. The rolls are made up from one half of the turkey meat, so that the extra skin along the back of the turkey is used for enclosing the roll when it is made and serves as a wrapper of natural skin to hold the roll together after it has been processed. During the processing, a very economical, and easy to use stretch net material is used for holding the roll together, and after it has once been cured and cooked, the skin itself serves as a natural wrapper that holds in natural juices and flavor and also makes the turkey roll able to withstand slicing operations, either mechanical or hand. The roll makes very attractive slices for table use.

BRIEF DESCRIPTION OF THE DRAWINGS

FIG. 1 is a top view, shown partly schematically, of a turkey, ready to be deboned;
FIG. 2 is a schematic top view of the turkey meat and skin after it has been removed from the bones;
FIG. 3 is a view of a roll after it has been initially formed;
FIG. 4 is a view of the turkey roll after it has been inserted into the stretch net used for holding the turkey roll together while it is being processed; and
FIG. 5 is a flow chart showing the steps in the processing of the smoked and boneless turkey roll.

DESCRIPTION OF THE PREFERRED EMBODIMENT

Referring now to the drawings, in FIG. 1, the turkey 10 is either hung up or placed upon a cutting board with the breast up, as shown. The meat and skin is cut from the carcass in one operation. The boning starts in the center of the breast and moves down along the legs and breast bone with a minimum amount of cutting, and leaving as much meat in place on the skin as possible. The wings are also deboned and the skin and the meat are left together. The deboned meat and skin shown at 11 is cut in half along line 12 so that the skin is divided in half. The back of a turkey carries very little meat. It is mostly skin. This gives a flap of skin 13 which can be used for covering some of the exposed areas of the other meat when the roll is made.

The process contemplates using only half turkeys to obtain this extra flap of skin 13 which has previously not been done. The meat is then made into a roll 14. The roll is tightly wrapped, and the flap of skin 13 is used to cover exposed meat so the roll is substantially completely enclosed with natural skin. The roll 14 is placed into a stuffer so that it can be slipped into an elastic net 15. The net 15 is called a "zip net." It is of stretch material which will exert an elastic force onto the roll. The stretch material makes an open network, as shown, and is tubular. The ends are tied off, and the net is stretched before the roll is inserted so that the net compresses the roll and holds it tightly packed. The net actually forms grooves in the roll, it compresses so tightly.

The skin is not fastened other than with the net, but the skin does substantially completely enclose the outer surfaces of the roll in this roll form. The extra flap of skin from the back helps or provides enough skin to make this covering.

The curing process is then started. Leaving the skin keeps the natural flavor and juices of the turkey inside the roll and does not let them escape during the processing. The curing is done with a comercial curing mixture sold under the name of "Hellers Southern Brown Sugar Cure" and consisting of salt, brown sugar, sodium nitrate (.80%), sodium nitrite, potassium nitrate and propylene glycol. The curing agent is a commercially available curing agent. The curing material is mixed with water (1½ pounds cure to 1 gallon of water). Then 1 pint of honey is added to each gallon of the curing liquid. The honey is added for extra flavor and also to act as a binder. The curing liquid is injected or pumped into the roll itself. This aids in curing the interior of the roll. The honey adds flavoring, and also helps to hold some of the meat chunks together and serves as a binder which has good flavor. The rolls are then placed in the curing liquid (including the honey) and submerged for from 3 to 4 days to complete the curing. The length of time of cure depends on the size of the roll. Other conventional curing agents can also be used, and the addition of the honey will aid any of the agents.

Following the curing, the rolls including the outer stretch net covers or forms 15 are removed from the curing liquid, they are then put into an outer mesh bag or tubing and hung up in a high pressure smoke house before the heat and smoke is applied. This hanging of the rolls allows the rolls to drain and aids in the subsequent smoking. The zip nets are in place and continue to exert compressive forces on the rolls while the rolls are hanging.

Once the unnecessary liquid is removed from the rolls the smoke house is put into operation, and the rolls are brought up slowly to an internal temperature of 165° F. They are held at this internal temperature under smoke (in order to get the smoke flavor) for one hour. The cooking and smoking operations are thus carried out simultaneously in the smoke house. They are then allowed to cool and the individual rolls are taken out of the mesh bag. The net stretch covers 15 ("zip nets") are then removed and the rolls, then comprising only natural meat and skin with no external holding wrapping, are placed in their outer bag for sale. A Cryovac bag may be used as the outer wrapping. The rolls can be frozen for storage.

When processed in this manner, the turkey meat has a delicate smoked flavor with the good turkey flavor still present. The natural skin wrapped around the roll holds the roll for slicing, and leaving the meat attached to the skin insures that the rolls will not come apart easily. The rolls can be marketed without any external means for holding the roll together during the cutting operation, such as a net bag or artificial casing.

The important steps of the process thus are to use turkeys in half sections so that the extra skin from the back of the turkey can be used for wrapping the outer portions of the roll to insure that the turkey roll is completely enclosed with natural skin to keep in the natural flavor and juices, and leaving the meat attached to the skin wherever possible so that there are few loose chunks of meat wrapped in the skins. The skin is attached to the meat except where the back flap 13 is used for closing over the roll. The skin flap 13 overlaps other skin, and the zip net will force the overlapping skin together. During the curing and smoking operations the overlapped portions will stick together so that the roll will hold together after the outer stretch net is removed. The honey in the cure liquid adds flavor and aids as a binder.

We claim:

1. A process for preparing smoked, boneless turkey rolls comprising deboning the whole turkeys by removing the bones from the meat without removing the meat from the skin;

halving the meat from a whole turkey by slitting the skin lengthwise along the mid-portion of the back skin to leave skin flaps on each of the sections of meat from each side of the turkey;

rolling the meat into a roll with the skin flap closing the open area of meat; and the skin exposed on the surfaces of said roll;

inserting said roll into a stretchable, elastic net cover to apply elastic forces to the roll to hold said roll in roll form for processing;

curing said roll in a liquid brine solution;

removing the roll from the cure and removing unnecessary liquid brine solution;

cooking and smoking said roll and after cooking and smoking removing said net cover to permit the skin to hold said roll together after processing.

2. The process of claim 1 including the step of curing said roll in a curing solution including an additive of honey.

3. The process of claim 2 further characterized in that the cooking and smoking operations are carried out simultaneously.

4. The process of claim 1 wherein said roll is brought up to an internal temperature of 165° and is held under heat and smoke for one hour at this internal temperature.

References Cited
UNITED STATES PATENTS

| | | | |
|---|---|---|---|
| 1,122,715 | 12/1944 | Fitzgerald | 99—229 |
| 2,267,442 | 12/1941 | Clark | 99—107X |
| 3,011,895 | 12/1961 | Toepper et al. | 99—107 |

HYMAN LORD, Primary Examiner

U.S. Cl. X.R.

99—107